July 7, 1925.
A. R. BRADEN
1,544,719
ART OF ELECTRIC WELDING
Filed Feb. 10, 1923
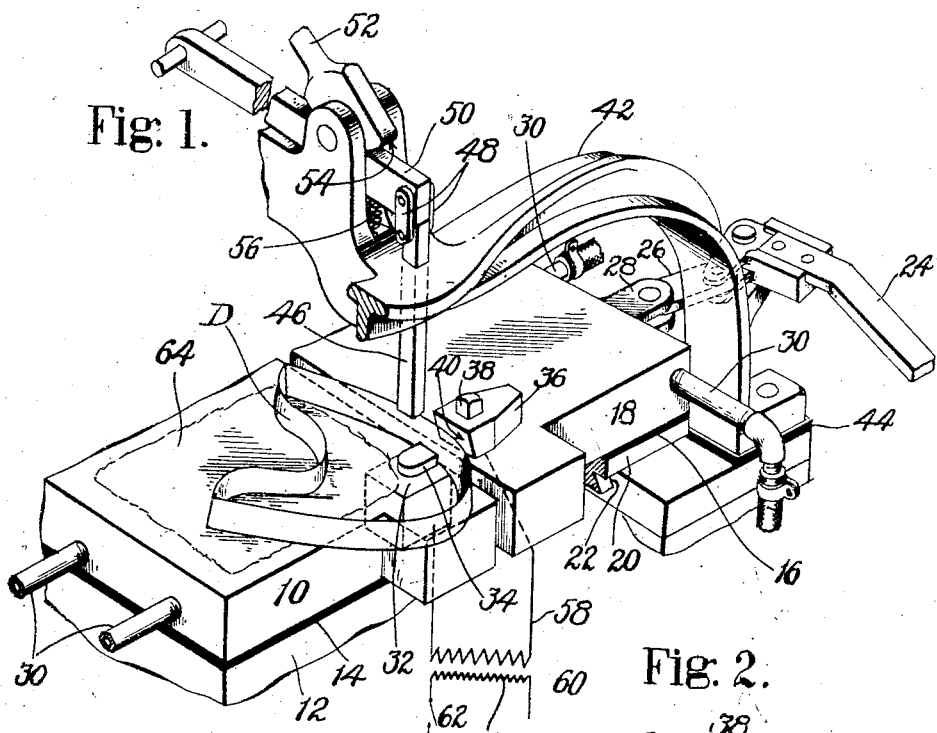
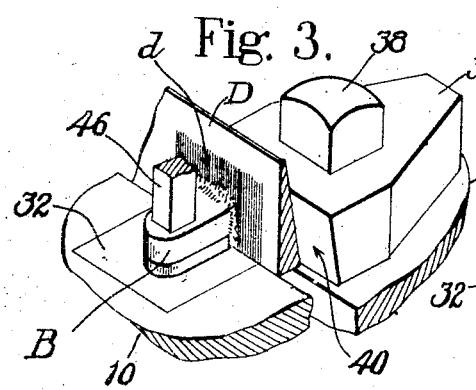
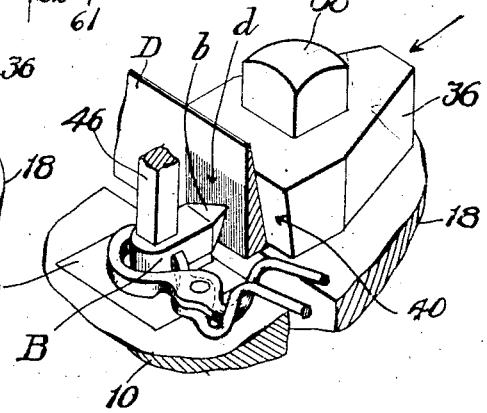
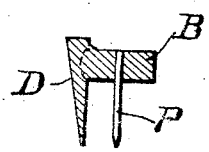
INVENTOR.
Albert R. Braden
By his Attorney,
Nelson W. Howard Patented July 7, 1925.

1,544,719

UNITED STATES PATENT OFFICE.

ALBERT R. BRADEN, OF BEVERLY, MASSACHUSETTS, ASSIGNOR TO UNITED SHOE MACHINERY CORPORATION, OF PATERSON, NEW JERSEY, A CORPORATION OF NEW JERSEY.

ART OF ELECTRIC WELDING.

Application filed February 10, 1923. Serial No. 618,400.

*To all whom it may concern:*

Be it known that I, ALBERT R. BRADEN, a citizen of the United States, residing at Beverly, in the county of Essex and State of Massachusetts, have invented certain Improvements in the Art of Electric Welding, of which the following description, in connection with the accompanying drawings, is a specification, like reference characters on the drawings indicating like parts in the several figures.

This invention relates to methods of and apparatus for welding together various objects, especially for the purpose of securing a projecting member upon a body. An instance of work to which my invention is particularly applicable is furnished in the manufacture of clicking dies carrying stab-blocks, or those projections from the inner side of the die upon which are mounted members for perforating or marking the pieces of material cut. In attaching these blocks to the die-walls, it has been customary to solder them together; but this does not furnish as strong a union as is desirable, and causes the blocks to be detached when the die is heated for the purpose of repair. This invention utilizes electric welding to effect a strong attachment of the blocks to the dies and in a manner not affected by heat. The internal, transverse knives of clicking dies may also be attached effectively in the same general manner as are the stab-blocks.

An object of this invention is to avoid overheating of the pieces to be joined, particularly the main portion which is to receive the projection. This is of importance in connection with such work as dies, to prevent burning the metal and thereby injuring the cutting edge. To this end, I localize the heat applied to soften the pieces to be joined, as by limiting the flow of heating current to an area closely adjacent to the surfaces to be welded. In operating upon clicking dies, for example, the body of the die is preferably supported upon a non-conducting surface, while the welding current passes through the stab-block which is to be attached, and through the body of the die immediately surrounding the point of contact of the block with it. Pressure is at the same time exerted to force the pieces together.

In welding stab-blocks or other objects of relatively small dimensions, the copper clamping members, ordinarily employed to hold in place such articles upon electric welding machines, when correspondingly reduced, would quickly become too much deformed, by the pressure applied while heated by the current flowing through them, to be effective. Iron clamping members for such purposes tend to weld to the stock when heated. It is further an object of this invention to furnish an efficient clamping device by insulating the clamping member from the terminals which are to apply the welding current and thus preventing its flow through said member. The latter is kept below welding heat and may be formed of a metal sufficiently resistive to deformation to permit it to be of the desired reduced dimensions.

Other objects will appear in connection with the following description, illustrated by the accompanying drawing, which represents one of the embodiments which the apparatus of this invention may assume. In this drawing, Fig. 1 shows, in perspective, the more essential portions of the apparatus;

Fig. 2 is a like view of that part of the apparatus directly co-operating with the work-pieces;

Fig. 3 similarly illustrates these parts after the welding has been accomplished, while Fig. 4 shows, in section, a completed weld.

In carrying out my improved method, the body-portion of the work, appearing in the drawing as a clicking die D, is placed upon the upper supporting surface of a table 10, this table being fixed upon a bed-piece or frame 12, from which it is electrically insulated at 14. Spaced from the table 12 upon the frame, and similarly insulated at 16, is a table 18 mounted upon a carriage 20 arranged to slide upon ways 22. To bring the elements to be welded into contact and exert upon them the pressure which will effect their union, the table 18 is moved upon its ways toward and from the table 10, this being, in the present instance, effected by a lever 24 fulcrumed upon the frame and connected by a link 26 to lugs 28 projecting from the outer extremity of the table 18.

Both the tables may be hollow, to allow them to be cooled by water supplied through pipes 30. Each of the tables, which are conveniently made of iron, is provided with a work-engaging terminal of an electric circuit. The table 10 is recessed at its inner edge to receive a block 32, this having an upper projection 34 serving as a support for the stab-block B or other object which is to be attached to the body D of the die. The upper supporting surface of the projection 34 is of a form generally corresponding to the face of the stab-block which is to rest upon it. The table 18 carries, in horizontal alinement with the projection 34, a block or pressure member 36, which is of somewhat greater height than the projection 34, preferably approaching the height of the die-stock. It may be secured in place upon the table by a screw 38 passing through it and being threaded into the table. The stock from which clicking dies are made is wedge-shaped in transverse section, and during the welding operation is preferably supported upon the table 10 with its wider or pressure-receiving edge in contact with the supporting surface. This presents, to the pressure member 36, a side wall of the die which is inclined upwardly and outwardly from such member. The pressure-surface 40 of the member 36 is inclined to correspond to the die-wall, so that it not only insures substantially continuous contact to give a proper path for the welding current, but also overhangs the die, and, when exerting pressure upon it, gives a certain component of force downward, this being effective to retain the die against displacement from the table. The blocks 32 and 36 are preferably of copper, since this metal will not weld to the steel of the die and stab-blocks. The manner in which they are applied to the tables permits them to be renewed readily when they become deformed by the heat and pressure.

Fixed upon the frame and extending over the tables is an arm or bridge-piece 42, which is shown as insulated from the frame, and therefore from the current-terminals, at 44. Mounted to slide vertically in the arm above the projection 34 is a clamping member in the form of a bar 46, which may be rectangular in cross-section. This bar, at its upper extremity, is articulated by links 48 to a horizontal arm 50 pivoted upon the frame-arm 42. The area of the lower or contact-end of the clamping bar is not substantially different from that of the opposed surface of the stab-block with which it is to contact, preferably being somewhat smaller, so that it will not interfere with the positioning of this block upon its support. The bar 46 I prefer to be of iron or steel, so that, in spite of its relatively small transverse dimensions, its form will not easily be changed by the heat to which it is subjected and the pressure which it applies. Fulcrumed upon the arm 42, above the pivoted arm 50, is a lever 52, formed at the end of its short arm with a cam-face 54 movable in contact with the upper edge of the arm 50. Normally, this arm 50 is raised by a helical spring 56 interposed between it and the frame-portion 42, this lifting the bar 46 away from the stab-block-support 34. Upon swinging the lever 52 toward the front of the apparatus, the cam-face 54 presses down the pivoted arm and brings the bar 46 against a stab-block carried upon the support to clamp this for the welding operation. For this clamping position, the form of the cam-surface is such that the arm is locked, it being released only by movement of the lever by the operator in the opposite direction, or rearwardly.

Connected to the tables are the terminals of the secondary circuit 58 of a transformer 60, the primary circuit 61 if which is joined to some suitable source of electric energy (not shown) and controlled by a switch 62. The transformer is so wound that the current in the secondary circuit will be of comparatively low voltage and great volume, to properly heat the contacting surfaces through which it flows.

In welding a stab-block B upon the die D, there is preferably formed upon the latter, at the point at which the block is to be attached, a polished area $d$ to facilitate the welding operation. The stab-block has, at the end which is to be joined to the die-wall, a reduced portion $b$, which is shown as of pyramidal contour, the apex being turned toward the wall of the die when the block is laid upon the projection 34 and clamped by the bar 46. The die is placed upon the table 10 before the application of the stab-block to its support, it surrounding the block and being separated from the table by a sheet 64 of electrical insulating material which is resistive to heat, such, for example, as asbestos. The table 18 is now moved inwardly to bring the wall 40 of the pressure-block 36 against the outer wall of the die opposite the point $b$ of the stab-block, and the switch 62 of the primary circuit is closed to cause a flow of current through the contacting areas of the objects. This, it will be observed, is almost entirely limited to that portion of the die immediately surrounding the point of the stab-block, since the passage of current through the body of the die from the table 10 is prevented by the insulation 64. The heating effect is consequently almost wholly confined to the place at which the weld is to be made. As this area of the die and the point of the stab-block are heated by the current, they soften, and the pressure exerted by the member 36 so forces the die-wall against the point *b* that the latter enters the substance of the die. This forms a depression which increases the area of the surfaces joined, and at the same time creates a positive resistance by the wall of the depression to lateral displacement, thereby producing a much stronger joint. This condition is well illustrated in Fig. 4 of the drawing. As the point *b* is forced into the die, it is itself flattened, so that it penetrates but a portion of the way through the die-stock and produces no protuberance upon the opposite side. After the welding of the block to the die, there may be mounted in the former the perforating or cutting member P of any desired form.

Having described my invention, what I claim as new and desire to secure by Letters Patent of the United States is:

1. The method of securing a projecting member upon a body, which consists in supporting the body upon a non-conducting surface, pressing the member and body together, and passing welding current through the member and through a portion of the body limited to that adjacent to the point of contact of the member with the body.

2. The method of securing stab-blocks upon clicking dies, which consists in supporting a die upon a non-conducting surface, fixing the block against movement, pressing the die against the block, and passing welding current through the block and through a portion of the die limited to that adjacent to the point of contact of the block with the die.

3. The method of securing a stab-block upon a clicking die, which consists in forming the block with a point, supporting the block in fixed position, carrying the die into contact with the point of the block, passing current through the die and block to soften them, and pressing the die against the block to cause the point to enter the die and be welded thereto.

4. The method of securing a stab-block upon a clicking die, which consists in fixing the block in place upon a conducting element, placing the die about the fixed block but insulated from the conducting element, moving a second conducting element against the die to press it into contact with the block, and passing welding current through the conducting elements, the die and the block while such pressure is exerted.

5. In a welding apparatus, a support, a clamping member co-operating with the support and insulated therefrom, a member arranged to exert pressure upon an object clamped upon the support, said clamping member being insulated from the support and pressure member, and means arranged to apply welding current to the support and pressure member.

6. In a welding apparatus, a table arranged to support a work-portion to be welded, from which table is a projection for supporting a work-portion, insulating material interposed between the table and the work-portion thereon, a clamping member co-operating with the projection, and a member arranged to press the work-portion upon the table against that supported upon the projection, the projection and pressure member serving as terminals for the application of the welding current.

7. In a welding apparatus, a table arranged to support a work-portion to be welded, from which table is a projection for supporting a work-portion, insulating material interposed between the table and the work-portion thereon, a clamping member co-operating with the projection, and a member arranged to press the work-portion upon the table against that supported upon the projection, the projection and pressure member serving as terminals for the application of welding current and the clamping member being insulated from such terminals.

8. In an apparatus for welding stab-blocks upon clicking dies, a table upon which the pressure-receiving surface of a die may rest, a clamping member for holding the stab-block, a pressure member having a contact face inclined upwardly to overhang the inclined face of the die, and means for applying welding current to the die and stab-block.

9. In an apparatus for welding stab-blocks upon clicking dies, a table upon which a die may rest, said table being provided with a projection to support a stab-block, a clamping member co-operating with the projection and having a surface for engagement with the stab-block approximating in contact-area the adjacent surface of said block, a pressure member acting upon the die and block, and means for applying welding current to said die and block, the clamping member being insulated from the applied current.

10. In an apparatus for welding stab-blocks upon clicking dies, means for supporting and applying welding current and pressure to a die and stab-block, a frame-portion extending over the supporting means, a clamping bar mounted to move in the frame-portion, and a cam-lever acting upon the clamping bar to actuate said bar and lock it in its clamping relation.

In testimony whereof I have signed my name to this specification.

ALBERT R. BRADEN.